United States Patent
Lee

(10) Patent No.: US 7,652,794 B2
(45) Date of Patent: *Jan. 26, 2010

(54) PREPRESS WORKFLOW METHODS FOR GENERATING IMAGES WITH IMPROVED MISREGISTRATION TOLERANCE UTILIZING GLOBAL AND/OR LOCAL PROCESSING TECHNIQUES

(75) Inventor: David L. Lee, Tacoma, WA (US)

(73) Assignee: International Paper Co., Memphis, TN (US)

( * ) Notice: Subject to any disclaimer, the term of this patent is extended or adjusted under 35 U.S.C. 154(b) by 1075 days.

This patent is subject to a terminal disclaimer.

(21) Appl. No.: 10/878,108

(22) Filed: Jun. 28, 2004

(65) Prior Publication Data

US 2005/0286085 A1 Dec. 29, 2005

(51) Int. Cl.
- H04N 1/409 (2006.01)
- G06F 15/00 (2006.01)
- G03F 3/08 (2006.01)
- G06K 15/00 (2006.01)
- G06T 5/00 (2006.01)
- G06K 9/00 (2006.01)

(52) U.S. Cl. .............. 358/3.26; 358/1.9; 358/518; 358/2.1; 358/3.27; 382/167

(58) Field of Classification Search .............. None
See application file for complete search history.

(56) References Cited

U.S. PATENT DOCUMENTS

| 2003/0007164 A1* | 1/2003 | Lee et al. ............ 358/1.9 |
| 2003/0197877 A1* | 10/2003 | Lee ............ 358/1.9 |

FOREIGN PATENT DOCUMENTS

EP 0 620 534 A1 10/1994

\* cited by examiner

Primary Examiner—Twyler L Haskins
Assistant Examiner—Barbara D Reinier
(74) Attorney, Agent, or Firm—Matthew M. Eslami

(57) ABSTRACT

A prepress workflow process suitable for generating a reproduction composite image from a source image that may be tolerant to or exhibit improved tolerance to misregistration when printed is provided. Embodiments of the prepress workflow process include obtaining a source image. Next, $N \geq 2$ color separations are generated from the source image. The color separations may be process or non-process color separations. The N color separations are first processed globally for improving the misregistration tolerance of a reproduction composite image to be formed therefrom. If the misregistration tolerance of the reproduction composite image is not acceptable to be user, at least a portion of each N color separation may be further processed at a local level for producing an improved misregistration tolerant reproduction composite image.

13 Claims, 19 Drawing Sheets
(11 of 19 Drawing Sheet(s) Filed in Color)

PREPRESS WORKFLOW METHODS FOR GENERATING IMAGES WITH IMPROVED MISREGISTRATION TOLERANCE UTILIZING GLOBAL AND/OR LOCAL PROCESSING TECHNIQUES

FIELD OF THE INVENTION

The present invention is directed to prepress printing methods, and more particularly, to methods for making reproduction composite images of an original color image that is tolerant of some misregistration during printing.

BACKGROUND OF THE INVENTION

Color printing by lithography goes back to the early years of the nineteenth century. Multiple stones were used, one for each ink printed, and the print went through the press as many times as there were stones. The problem was then, as it is today, to keep these individual images in proper register. Considerable skill was required on the part of the printer to make sure that each color would be in the correct position and that the overlying colors would merge correctly. The process left much to be desired and up to the middle of the century the highest quality works were colored by hand. High costs severely limited availability of color illustration. The development of a number of photomechanical processes near the turn of the nineteenth century reduced the level of skill needed and greatly expanded the use of printed illustration. Processes such as photolithography, photogravure, photoengraving, and others, allowed the image to be photographically transferred from an original photograph or drawing to a printing plate. These processes initially were useful only for black and white illustration. The later invention of the trichromic halftone process was a major breakthrough in printing color images. Improved photographic films with wide spectral sensitivity allowed the use of individual camera filters which removed all colors except the red, green and blue spectral region of the original. This allowed the preparation of a series of halftone plates that printed the images in complementary cyan, magenta and yellow inks. So-called process printing, using subtractive primary Cyan, Magenta, and Yellow inks, along with blacK ink (CMYK) is now in wide use.

While equal amounts of superposed transparent cyan, magenta, and yellow inks would nominally produce black, the result is more often a muddy brown. The separate black ink is used to overcome the spectral impurities of the three subtractive primaries. With standard process printing, four image separations are needed, one for each ink color. A separation is a monotone (gray scale) image that indicates how much of a given color ink needs to be printed at a given location. For higher quality printing where a wider color gamut might be needed, other processes such as Hexachrome® can be used. Hexachrome is a registered trademark of Pantone, Inc., Carlstadt, N.J. This process adds orange and green to the basic CMYK colors. A black separation is also normally used to provide a wider range of image luminance and render better neutral grays and shadow density.

Common to all color reproduction processes is the need to hold tight register between the various separations during printing. For analog devices using printing plates on a press this is a major problem. Analog processes include those known as gravure, flexography, lithography, screen, and letterpress. In particular, the ability to hold register in the machine direction is generally worse than holding side-to-side register. Even a displacement as small as 0.085 mm (0.003 inch) can produce noticeable unpleasing artifacts that result in an unsatisfactory printed image. This small displacement translates into a single row of halftone dots at a 150 lines per inch screen ruling. The amount of image degradation relates directly to the amount the plates are out of register. Additionally, although to a lesser degree, maintaining exact register for various digital printing devices, such as ink jet or laser jet printers or short to medium run digital presses, is also needed.

With conventional color separation technology, the resulting image in each of the separations carries both object color and object detail information. This is extremely important to keep in mind. This system is entirely satisfactory for printing when all printing plates can be held in exact register. However, the method suffers badly when any of the plates is out of register. An out of register image can render multiple images of a given object, introduce unwanted edges, unwanted colors, apparent poor image resolution, and other unpleasant artifacts. The printed image gives the viewer an immediate sense that something is wrong.

One widely implemented technique used to minimize the problem of misregistration is called "image trapping". An oversimplified explanation of this might be the situation where a well defined object is seen against a contrasting uniform background. If the area occupied by the object is made a bit larger than the space it would normally occupy (image spreading), the danger of a white edge appearing is reduced if the separations are somewhat misregistered. Alternatively, the background space that the image would occupy can be made somewhat smaller (image choking). Another alternative is to use a heavy border that overlaps the image. In all cases there is overlap of the image border onto the background area. U.S. Pat. No. 6,236,754 describes one somewhat different technique to mask misregistration at object borders.

The effectiveness of various trapping methods is limited since choking and spreading strategies deal primarily with borders between the boundary of a given object and its adjacent background. Details of edges within a given object are not addressed nor are complex images where there is poor separation between object and background.

The conventional solution to holding register of multiple overprinted images is to use complex sensors and feedback control to the printing hardware. This approach is expensive and is often impractical in many applications such as newspapers and corrugated packaging. In the past, quality requirements for these uses have been somewhat less stringent. Competition is now pressing even the low-end color printing applications to improve their quality.

SUMMARY OF THE INVENTION

Embodiments of the present invention address techniques, for example, for dealing with edges within a given object field by minimizing or eliminating misregistration artifacts in the printed images. Additionally, embodiments of the present invention are directed to lower end color printing applications and more stringent printing applications alike.

In accordance with aspects of the present invention, a prepress workflow method is provided. The method includes preparing N color separations from a source image, processing the N color separations globally to improve printing misregistration tolerance in a reproduction composite image formed by the processed color separations, and thereafter, processing further the N color separations if the global processing does not achieve acceptable misregistration tolerance results for at least one region of interest. The region of interest is processed to improve printing misregistration tolerance for the respective region of interest.

In accordance with another aspect of the present invention, a prepress workflow method is provided. The method includes obtaining a color source image; preparing N color separations from the source image, processing the N color separations globally to improve printing misregistration tolerance, and thereafter, processing a region of interest within each N color separations to improve printing misregistration tolerance for the respective region of interest.

In accordance with still another aspect of the present invention, a shipping container is provided. The shipping container includes a container body and a color reproduction composite image coupled to the container body. The color reproduction composite image includes a first layer of colored ink having a region of interest with enhanced image detail and a second layer of colored ink having a region of interest with degraded image detail. The first ink layer region of interest and the second ink layer region of interest cooperatively overlap to improve the misregistration tolerance of the color reproduction composite image.

BRIEF DESCRIPTION OF THE DRAWINGS

The file of this patent contains at least one drawing executed in color. Copies of this patent or patent application publication with color drawings will be provided by the Office upon request and payment of the necessary fee. The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
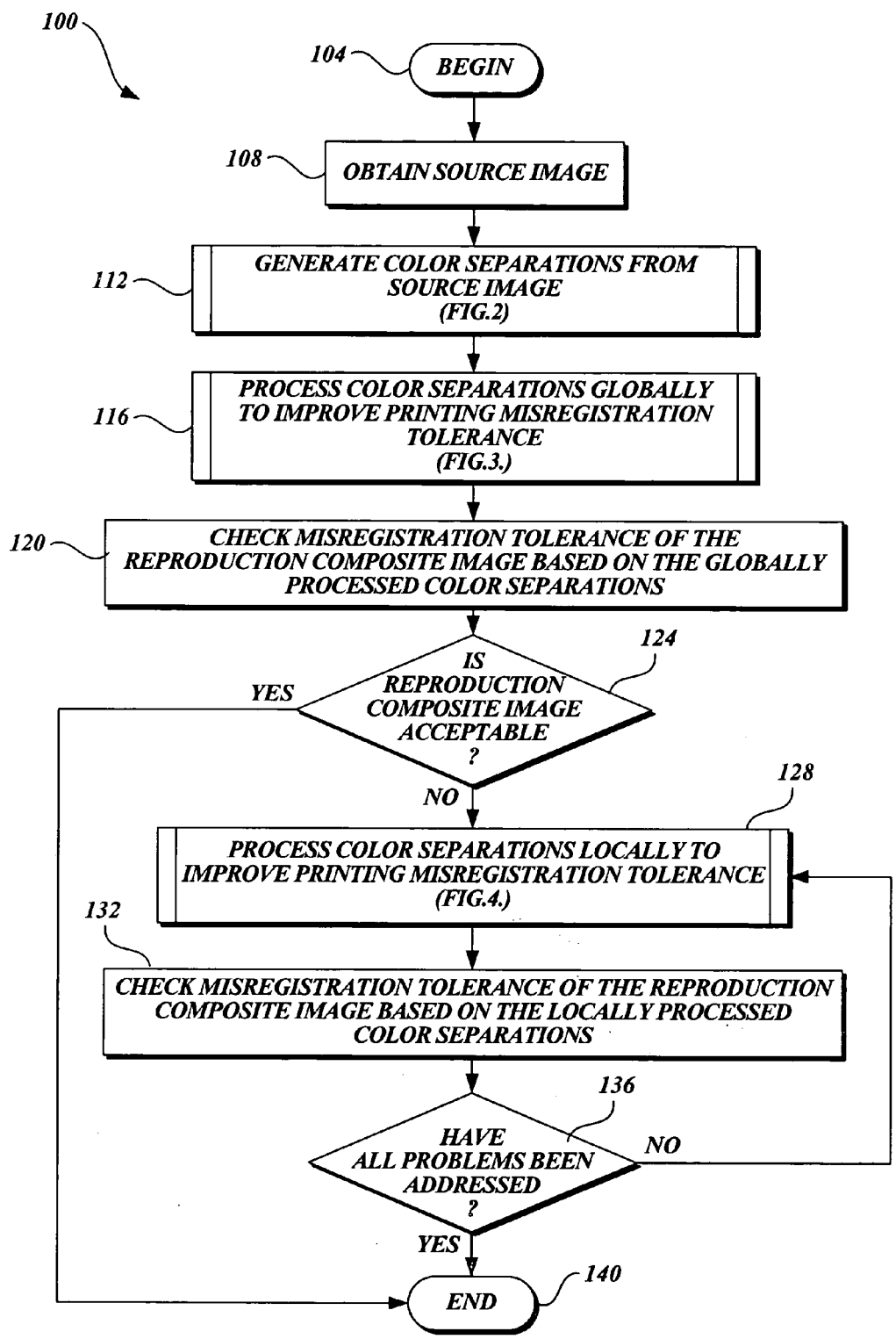
FIG. 1 is a flow chart depicting one exemplary prepress workflow process formed in accordance with aspects of the present invention for generating a reproduction composite image that may be tolerant to misregistration when printed.

Embodiments of the present invention will now be described with reference to the accompanying drawings where like numerals correspond to like elements. Embodiments of the present invention are directed to image processing techniques for achieving misregistration tolerant reproduction composite images or improving the misregistration tolerance of the reproduction composite image when generated with either process or non-process color separations. The following description provides examples of a prepress workflow process that globally and/or locally processes color separations to improve misregistration tolerance of reproduction composite images; however, it should be apparent that these examples are only illustrative in nature and should not be considered as limiting the embodiments of the present invention, as claimed.

A. GENERAL TERMS AND PHRASES

In the description that follows, terms such as "record", "separation", and "channels" will be to some extent be used interchangeably. The term "image record" dates back to the earlier days of process printing when halftone printing plates were derived photographically using contact negatives. Color produced by devices or objects that emit or generate their own light (the sun, TV, etc.) is referred to as an additive color system. Red, green, and blue are known as the additive primaries. By mixing various amounts of these primaries an incredibly large number of colors can be generated and distinguished. A scene or image was recorded by taking separate photographs through red, green, and blue filters. These provided negative grayscale records of the spectral components. For example, the red record (negative) defined the amount and location of cyan ink (complimentary to red) to be printed. Similarly, the positive of the red record encoded the location and amount of red light being reflected by objects in the original scene. A fourth image provided a record for application of black ink, where that was also used. The three film negatives, referred to as "separations" were then used to prepare printing plates for the cyan, magenta, and yellow inks generally known as "process primaries". These colors, complementary to the red, green, and blue primaries are referred to as "subtractive colors" since they "subtract" or remove by absorption the other colors from the light striking them and reflect or pass only their own color. When colors are produced by objects that do not emit light on their own; i.e., require illumination to be seen, the system is referred to as a subtractive system. This includes virtually all objects viewed by our eyes.

The three subtractive colors, placed one above the other as transparencies, nominally produce black. On the other hand the subtractive primaries can produce additive colors when in an overlapping arrangement. Thus, red can be produced by a mixture of cyan and magenta, blue from a similar mixture of magenta and yellow, and green from cyan and yellow. While judicious overprinting of cyan, magenta, and yellow inks can produce a nominal red, green, and blue, it is well known in the printing arts that the size of the color gamut of subtractive primaries used in printing inks is considerably smaller than the gamut of colors defined by the additive primaries.

In many cases CMY ink separations will also be used with a black separation since ink imperfections tend to result in muddy blacks rather than jet blacks when all three inks are overprinted. In this case the separations are referred to as CMYK, the black channel being designated K in order not to confuse it with blue.

Electronic digital imaging has changed the aforementioned techniques considerably, thus it has became necessary when using digital images to encode color information using an additive system. Images in such devices as scanners and digital cameras are captured by a myriad of minute sensors equipped with equal numbers of red, green, and blue filters. However, these systems record image positives, in contrast to image negatives on film. The three filters decompose the image into three grayscale positives, usually referred to as "separation positives" or "channels". If each separation positive or channel was inverted to a negative, then they would render separations for cyan, magenta, and yellow inks, the so-called "process primaries". Throughout the description that follows "separations" will refer to image negatives while "separation positives" and "channels" will refer to image positives. The negatives serve as an encoding record for cyan, magenta, and yellow inks while the positives serve as red, green, and blue records.

Specifically, the term "separation positive" is used throughout the specification. As was described above, separation positives are analogous to channels and are referred to in the illustrative examples herein when the images are processed using suitable image processing software, such as Adobe Photoshop®, in an additive computer system. However, the methods of the present invention hereinafter described apply generally to all systems, and therefore, may alternatively be employed in a subtractive system or workflow process.

As well known in the art, separation positives or channels may be haft-tone screened, and then inverted to create their respective negative (separation) suitable for use in preparing printing plates for a conventional printing press. Alternatively, final separations (negatives) may be generated by inverting separation positives or channels prior to being halftoned screened. The terms "screening", "half-toning", and "half-tone screening" are considered equivalents, and thus have been used interchangeably throughout the specification. These terms generally mean the process of converting a continuous-tone image into a discrete, binary image (bitmap) composed of "ink" and "no ink" encoding for use on analog printing devices.

The term "misregister" and "misregistration" should be considered as equivalent to the image processing term "image phase error."

Embodiments of the present invention may be used with transparent inks. Characteristics that constitute ink transparency are defined in ISO publications ISO 2846-1 through ISO 2846-5. Embodiments of the present invention are not in any way limited to the use of either CMY process inks or inks that simulate the additive RGB colors. These and other inks of any other available color may be used.

B. ILLUSTRATIVE EMBODIMENTS OF THE PRESENT INVENTION

FIG. 1 is a flow diagram depicting one exemplary prepress workflow process, generally designated 100, which is formed in accordance with aspects of the present invention. The prepress workflow process 100 is suitable for generating a reproduction composite image from a source image that may be tolerant to or exhibit improved tolerance to misregistration when printed. The following description of the prepress workflow process 100 will be explained in greater detail with reference to a reproduction composite image formed using two non-process color separations; however, embodiments of the present invention should not be so unduly limited. It should be appreciated that the prepress workflow process 100 works well with both process and non-process color separations of any number. For example, the prepress workflow process 100 works well with CMY, CYMK, or CMYabc color separations, as well as Duotone, Tritone, Quadtone color separations, just to name a few.

Generally described, the process 100 begins at block 104 and proceeds to block 108 where a source image is obtained. Next, N color separations are generated from the source image at block 112. The N color separations are first processed globally for creating a misregistration tolerant reproduction composite image at block 116. The misregistration tolerance of the reproduction composite image is then checked at block 120, and if determined acceptable at block 124, the process 100 proceeds to block 140 where the process 100 ends. If the misregistration tolerance of the reproduction composite image is not acceptable, the process 100 proceeds to block 128, where at least a portion of each N color separation is further processed at a local level, i.e., individual elements within the image, also known as a region of interest ("ROI") are processed, for producing an improved misregistration tolerant reproduction composite image. Again, the reproduction composite image is checked after the local processing at block 132. If all of the problems have been addressed at block 136, the process 100 proceeds to block 140 where the process 100 ends. Otherwise, the process 100 returns to block 128, wherein additional image elements or regions of interest may be locally processed until an acceptable misregistration tolerant reproduction composite image is produced or all of the problems noted at block 120 have been addressed.

After the process 100 ends, the processed color separations may be half-toned screened using screening techniques known in the art. The resultant half-toned screened color separations may then be employed for preparing plates for a conventional printing press. In embodiments of the present invention, the misregistration tolerant reproduction composite image is printed on a container blank or container, e.g., a shipping box or blank, suitable for use in the packaging, shipping or storing industry. The misregistration tolerant reproduction composite image may be printed on any container material, but not limited to, paperboard, fiberboard, containerboard, and corrugated containerboard. Alternatively, the misregistration tolerant reproduction composite image may be printed on a paper, polymeric, or other suitable substrate that is initially separate from the container and then coupled to the container by any technique known in the art. Suitable nonlimiting examples include preprinted liner material. It will be appreciated that in the alternative embodiments, the misregistration tolerant reproduction composite image may be printed on the separate substrate using a printing press or digital printing means, such as a color laser or inkjet type printer.

Referring now to FIG. 1, the steps of the prepress workflow process 100 will be described in greater detail. As best shown in FIG. 1, the first step of the prepress workflow process 100 occurs at block 108, where an original, full-color composite image, i.e. a "source" image that would typically be reproduced using four-color process printing, is obtained. For example, the source image may be a natural scene containing complex content, e.g. a photographic image in contrast to simple line art or drawn illustrations. The source image may be any conventionally encoded digital image, preferably 8 or 16 bit, in one of many color image formats, such as "RGB" (a 3-color system including red ("R"), green ("G"), and blue ("B")), "CMY" (a 3-color system including cyan ("C"), magenta ("M"), and yellow ("Y")), or "CMYK" (a 4-color system including the "CMY" colors and black ("K")).

Figure 5:
FIG. 5 is a sample illustration of a source image.

The source image can be transferred as a digital image into the computer memory of an image processing computer system using any one of numerous means of transferring a document into computer memory. For example, the source image may be downloaded from a secondary source, such as the Internet, a CD-ROM, or a digital camera. Alternatively, the source image may be created in the computer system by using a commercially available design program, such as Adobe Illustrator® or Macromedia Freehand®. The source image may also be obtained by digitally scanning a printed image using a scanner and an associated computer system both well known in the art. In the illustrative examples hereinafter described, the source image is an RBG encoded digital image capable of being viewed on an additive color system using a computer with a CRT monitor or equivalent display device. As best shown in FIG. 5, an image that depicts mixed fruit on a pale yellow cloth with blue and white napkins will be used as the source image. As can be seen, the dominant colors are green, red, and brown although small areas of yellow, blue, white, and black are present.

The process 100 proceeds to block 112, where N color separations are generated from the source image. For example, the source image may be, but is not limited to being, separated in one of the following four ways: (a) an RGB encoded image separated for five or more inks; e.g., to CMYKabc using International Color Consortium (ICC) profiles or other empirical or model-based separation methods with CMYK process inks and ink colors "a", "b", "c"; (b) an RGB encoded image separated for three-color or four-color process printing, i.e. to either CMY or CMYK, respectively, using ICC profiles or other empirical or model-based separation methods; (c) an RGB encoded image separated for two and three-color, non-process printing, using ICC profiles or other empirical or model-based separation methods to be printed with process as well as non-process inks; or (d) an RGB encoded image separated for traditional two (Duotone), three (Tritone) or four-color (Quadtone) printing using commercial or other available separation methods. It will be appreciated that other higher order separation architectures may also be used.

In one embodiment of the present invention where non process inks will be used, N spot color separations are generated from the source image at block 112. The generated N spot color separations, when superimposed, preferably render a realistic reproduction composite image of the source image. The N spot color separations may be generated by one exemplary subprocess 200 illustrated in FIG. 2.

Figure 2:
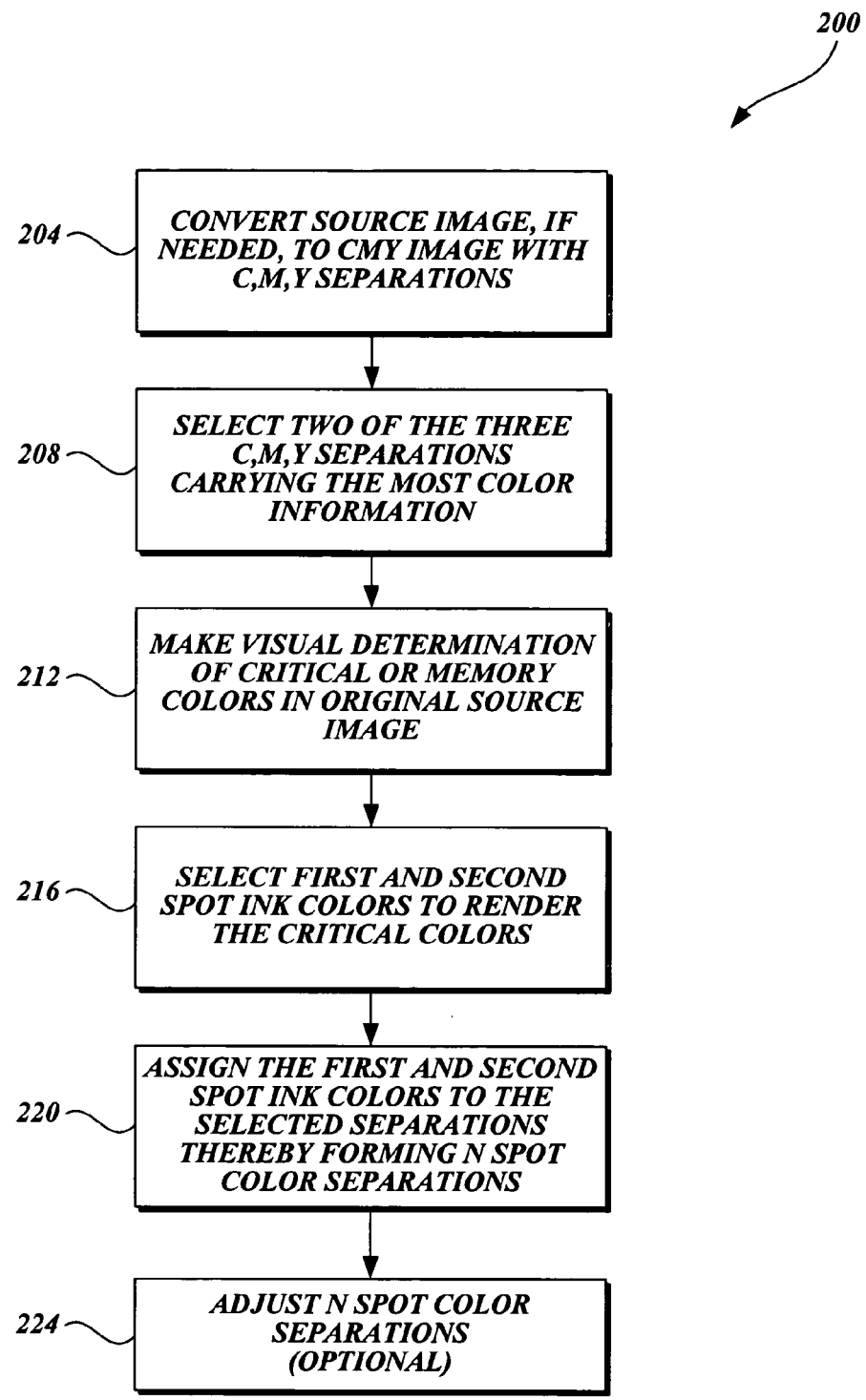
FIG. 2 is an exemplary flow chart depicting a spot color separation generating subprocess suitable for use by the prepress workflow process of FIG. 1.

Referring now to FIG. 2, the exemplary subprocess 200 for generating N-spot color separations will be described in detail. The routine 200 begins at block 204 where the source image is converted, for example, to an cyan, magenta, and yellow (CMY) encoded source image (hereinafter "CMY source image") and its associated separations. In one embodiment, an RGB source image may be readily converted to a CMY source image using complimentary mapping techniques. Alternatively, the source image may be converted to other formats, such as a CIE L*a*b* format, using encoding techniques such as look-up table mapping. Complementary mapping generally refers to the color(s) a filter of a given color absorbs. For example, since a red filter passes red (R) light but blocks green and blue light, its complement; i.e., 1-R, yields the amount of non-red light, which is essentially green and blue. Cyan light is a mixture of green and blue light. Look-up table mapping generally refers to the relationship between RGB and CIE L*a*b* color. Because RGB is a device dependent encoding method, a given RGB triple is associated with a specific L*a*b* color coordinate under an empirical mapping system. It will be apparent that this conversion may be omitted if the source image is obtained in CMY color format.

Figure 6:
FIG. 6 is a sample illustration of a CMY source image and its CMY separation positives converted from the source image of FIG. 5 using commercially available software.
Figure 6:
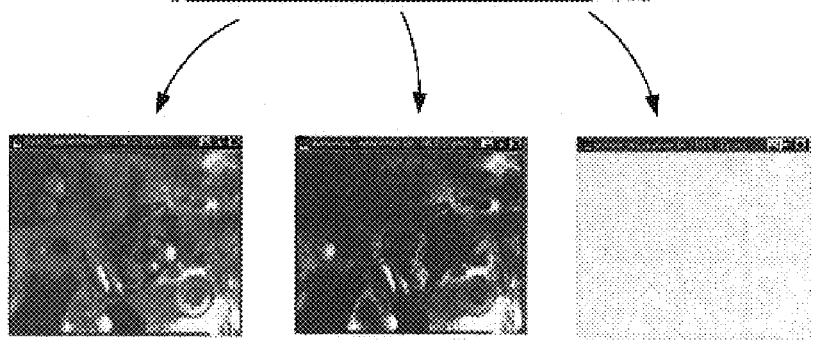

In one embodiment of the present invention, after obtaining the source image by, for example, any manner described above, the source image may be imported into an image processing software program, such as Adobe Photoshop®, executed on a well known computer system. The image processing software program, when executed, enables the source image to be processed according to user selected commands. The source image may then be converted by Photoshop® into the CMY source image by a mode change. The processing software re-expresses the original RGB encoded source image in CMY units; i.e., it yields a CMY source image and three ink separation positives of the source image for the cyan, magenta, and yellow inks (C, M, Y separation positives). FIG. 6 illustrates a CMY source image as well as the cyan, magenta, and yellow separation positives generated in Photoshop®. Other suitable software programs that may be employed to convert the RGB source image into a CMY encoded image and its associated separation positives are Adobe Illustrator®, QuarkXPress™, available from Quark, Inc. Denver Colo.; CorelDRAW® and other packages, available from Corel Corp., Ottawa, Ontario; and Paint Shop Pro, a shareware program available on the Internet.

It will be appreciated that the RGB source image may be optionally adjusted prior to CMY conversion. For example, visual adjustments of contrast, tonal value, brightness, and color balance may be accomplished using the commercially available software programs mentioned above, other known or future developed software, or by other known methods.

In one embodiment of the present invention, the subprocess 200 may proceed to block 208 where two out of the three C, M, Y separations (i.e. CM, CY, MY), which are considered to be carrying the most important color information of the source image, may be visually chosen. For instance, in an example illustrated in FIG. 6, the user may look at the generated separation positives displayed on the computer display device and visually determine which two separation positives of the CMY separation positives convey the most color information with respect to the original source image. Typically, this will be the cyan and magenta separations since they typically convey at least about 70-80% or more of the color information. However, other occasions will arise when the yellow separation would be an essential separation to choose. The ultimate choice is typically scene-dependent, and may be somewhat subjective. As is immediately apparent, the cyan and magenta separation positives of FIG. 6 are the most important to the overall source image.

The original source image may be then inspected by the user at block 212 to determine dominant or critical object colors or other important features such as memory colors critical to the visual impact of the source image. In like manner, areas of the original source image that are not of significant importance that could possibly be rendered in another color are noted. It should be noted that while in most cases it is desired to replicate the original colors as closely as possible, situations can arise when considerable departures may be preferred. This is a choice that may be made by the user depending on the final effect he or she is attempting to achieve. From a review of FIG. 5, the red and green fruits, yellow bananas and lemon, and brown background objects, possible choices for the dominant colors may be either red/green or magenta/cyan.

The subprocess 200 continues from block 212 to block 216, where first and second transparent spot ink colors, which will represent the selected dominant object colors with suitable accuracy, are chosen from an ink color palette or color swatches. These usually are "memory colors" or colors that represent specific objects that must be reproduced for the reproduction to appear realistic; e.g., it is desirable that bananas should be yellow. Spot colors might be a green and a red, a red and blue, a yellow and blue, etc. While any color ink can be used with a given separation, preferably there is some agreement of the ink color used to print the separation and the color that separation represents. For example, given a cyan separation, reasonable ink choices would be some variation of a cyan, blue, or green, i.e. a "cool" ink. Similarly, reasonable candidates for the magenta separation would be red, magenta or orange, i.e. a "warm" color. The yellow separation would typically be a yellow or red ink. Since a red separation tells us where and how much red ink to print, straying too far from a red ink may yield poor results, especially if accurate color reproduction is the goal. It should be noted that purposely mismatching color with a separation can lead to interesting and useful effects, therefore this technique should be considered to be within the scope of the invention.

In an illustrative example, red and green ink colors were selected since these were considered important memory colors. Specifically, for the source image of FIG. 5, PANTONE Red 032 and PANTONE Green 360 have been selected from the ink palette for the magenta and cyan separations of FIG. 6, respectively. If magenta and cyan inks were chosen instead in this example, it would have been difficult to render true reds and greens of the original source image without a yellow ink also being present. Further, it is important for the chosen inks to be able to render a reasonably good gray or black. The luminance component (black and white signal) can also be extremely important. Poor gray reproduction may make some ink color systems unusable despite the pairs being able to render a large color gamut.

Figure 7:
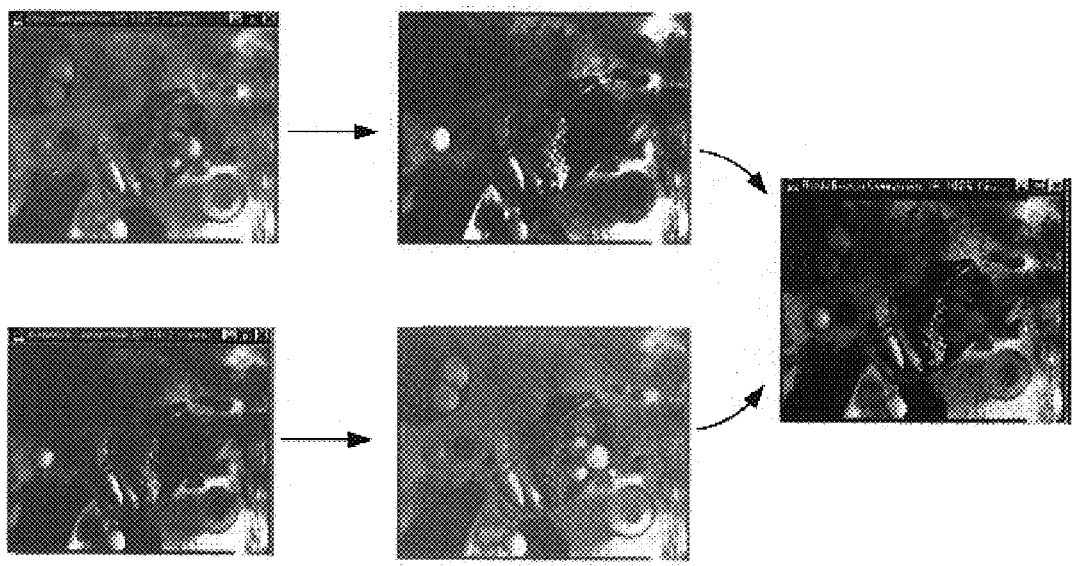
FIG. 7 is a sample two spot color reproduction composite image and the spot color separation positives (and the C, M, or Y separations that render the spot color separation positives) that form the two spot color reproduction composite image.

Once the first and second spot ink colors are chosen, each is assigned to one of the two selected CMY separations at block 220, typically assigning each spot ink color to the selected separation having the most agreement therebetween. In an illustrative example, PANTONE Red 032 and PANTONE Green 360 are assigned to the magenta and cyan separation positives, respectively. The separations are then rendered in the chosen spot colors (referred herein as "spot color separations"). In the illustrative example, this is best shown in FIG. 7 where the separation positives are rendered red and green using commercially available software, such as Adobe Photoshop®. This may occur automatically when the colors are assigned to the separation positives, or may be a user initiated command.

It will be appreciated in the illustrated embodiment that only two of the original C, M, Y separations were selected and used. However, the unselected separation, in this case yellow (Y), may remain unused, or as will be explained in detail below, may be used to carry a masking color, if desired. Further, the unselected separation may be used if the dominant or memory colors require a third ink to realistically reproduce the source image. In this latter embodiment, three spot color separations (N=3) would be generated. For example, if the red and green inks could not render a realistic yellow for the banana, the yellow separation may be used to generate a yellow spot color separation.

From block 216, the spot color separations are superimposed to form a reproduction composite image. In the illustrative example, the image at the far right in FIG. 7 depicts the reproduction composite image formed by the red and green spot color separation positives using commercially available software, such as Adobe Photoshop®. The reproduction composite image may then be inspected and adjustments may be made at block 224, if desired.

Figure 8:
FIG. 8 is the two spot color reproduction composite from FIG. 7 after adjustment using commercially available software.

For example, global and local adjustments may optionally be made in the grayscale values of each spot color separation positive. Other adjustments may also be made again for contrast, tone, and brightness in these new spot color separation positives. This will effectively control the amounts of each ink to be applied in order to produce a color result most closely representing the ultimately desired image where such adjustment is achieved by grayscale manipulation. Essentially, this means increasing or decreasing the overall grayscale image density to ultimately result in a greater or lesser amount of ink of the chosen color being applied. This adjustment may be either global or local or both. Global adjustment results in varying density of the overall image whereas local adjustment refers to varying density only in a predefined area, object or region of interest. These adjustments are well within the capability of the commercially available software programs. FIG. 8 depicts the reproduction composite image of FIG. 7 after these adjustments were made. By this means, the user has considerable latitude over reproduction of the overall scene as well as the color of specific objects within the scene.

As seen in the far right image of FIG. 7, the reproduction composite image without any grayscale adjustment gives a reasonable rendition of the original image. Globally adjusting the grayscale values of the two selected spot color separation positives as shown in FIG. 8 improves the greens and lightens the table cloth. Local grayscale adjustment of the originally blue fabric at the bottom renders it in a pleasing green. While not true to the original color, this was regarded as a relatively unimportant part of the original image. The fruit was the important portion of the image and, except for lighter yellows of the bananas and lemon, is entirely believable. It is important to remember that this was done using only two inks and would ultimately greatly simplify printing, decrease potential of misregistration, and reduces ink costs where precise fidelity to the original was not essential.

If the reproduction composite image is not accurate enough to the user when compared to the source image, other colors may be chosen at this time and the aforementioned steps, shown in blocks 216-224, may be repeated. The phrase "accurate enough" used in the previous sentence should be considered very subjective. Since no two spot color reproduction composite image can reproduce every color in the original with absolute accuracy, accurate enough should be considered to mean "realistic", "esthetically pleasing", or "acceptable for the intended purpose". The technique relies considerably on subjective evaluation for deriving suitable separations.

While embodiments of the present invention are operable using only CMY separations, it may be preferred to also make RGB separations. With six separations, the choices for combining two separations are expanded from three (CM, CY, and MY), when using only CMY, to fifteen with CMY and RGB. It will also be readily apparent that in principle, many more ink separations could be produced for specific colors other than RGB and CMY (for example orange). In practice this is not necessary. These six separations reduce the incredibly large number of possible separations to a reasonable, workable number. This is possible because a six-separation color architecture is a good approximation of the intermediate colors lying between any two separation colors; e.g., orange lies between yellow and red. In the above example a yellow or red separation approximates an orange separation. Given their close proximity, either could be rendered with an orange ink despite the fact that we lack the orange separation. Visual adjustments of the grayscale effectively modifies the yellow or red separation to produce an acceptable orange separation. Viewed in this manner, the six proposed separations serve as initial separations from which final ink separations for a unique color can be visually created by global and local manipulation of that channel's grayscale.

Embodiments of the present invention are also useful for printing on substrates of most colors with the exception of dark grays and black. For example, reproduction images produced by embodiments of the present invention are suitable for printing on corrugated containers used in the packaging industry. Even black medium can be used if a third masking separations is added. Substrate color may be simulated as a temporary third spot color separations. This color separation will not ultimately be printed, however. Instead, it will serve to enable additional grayscale adjustment of the original two spot color separations. These can be manipulated to offset, or in some instances to take advantage, of the substrate color. For example, printing on a non-white substrate generally calls for reducing the overall ink amounts since not making this correction often yields a dark reproduction. In some cases the substrate can provide a useful and "free" third color, which can be exploited to improve the color gamut for the ultimate image. In effect, this creates a third separation that allows the substrate's color to contribute to the overall color of the reproduction composite image.

For example, the adjusted image of FIG. 8 is shown printed on a white substrate. Often printing to a white substrate is not possible, the brown color of unbleached Kraft corrugated containers being a prime example. This so-called brownboard is formed from unbleached Kraft liner plies enclosing a corrugated interior ply. To date these containers have almost universally been printed with opaque inks and relatively simple imagery consisting of text, line, and simple colored fields. Using embodiments of the present invention, attractive, continuous tone, photographic-like images can now be printed on Kraft paper or other substrates, regardless of the medium's color.

Figure 9:
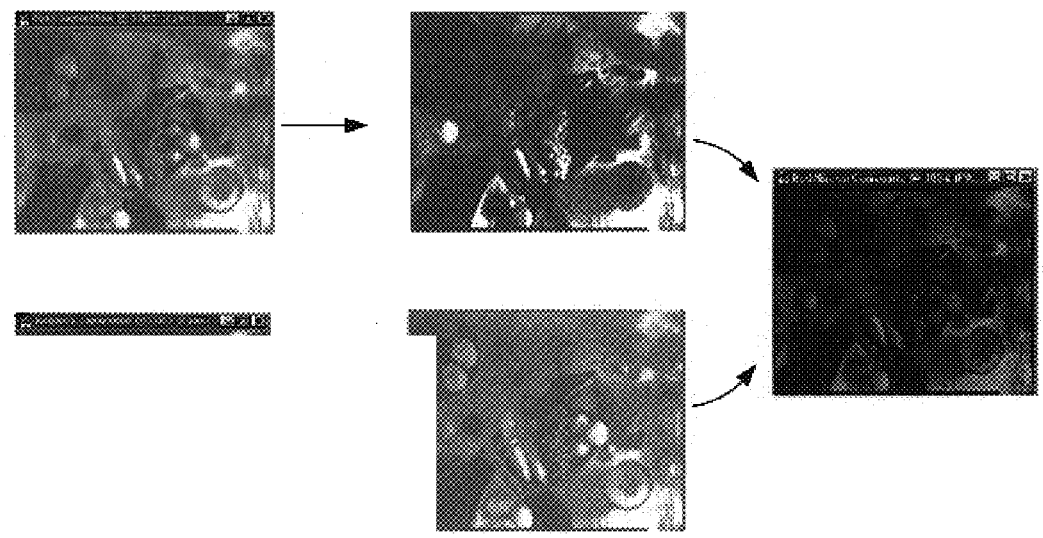
FIG. 9 is a sample two spot color reproduction composite image on unbleached Kraft, and the spot color separation positives (and the C, M, or Y separations that render the spot color separation positives) that form the two spot color reproduction composite image.

The far right image in FIG. 9 depicts how the adjusted image of FIG. 8 would appear if printed on an unbleached Kraft paper. In an illustrative embodiment, paper color is simulated by using PANTONE 465 in the third (or yellow) and previously unused separation positive of the original CMY source image and combining it with the other two spot color separation positives. Note that this is not a conventional three-color "process". The third separation positive will not be printed but is added solely for the purpose of adjusting the grayscale values of the other two separation positives, simulating the presence of a dark or non-white substrate. The original red and green separation positives can be once again adjusted to give the most pleasing rendition on the Kraft substrate. In principle, any number of additional spot channels can be created for such purposes, i.e. to simulate substrate color and texture (separations not printed) or for masking channels (separations printed), or other desired effects to help generate separations.

Figure 10:
FIG. 10 is the two spot color reproduction composite from FIG. 9 after adjustment using commercially available software.

The final result may be seen in FIG. 10. The color of the Kraft paper is actually used in a positive manner since it restores some of the yellows missing from the image shown in FIG. 8, printed on white paper. Again, it is important to remember that the wide range of believable colors achieved on the fruits and background has been achieved by using only two overprinted transparent inks. The bananas in the reproduction composite image in FIG. 10 look yellower than the equivalent image in FIG. 8 since a weak yellow is contributed by the unbleached Kraft paper. Note that the white cloth left of center at the bottom continues to appear "white" to the eye, even though the system is incapable of producing a white color. This is because the lightest color that can be reproduced is the brown of the substrate, achieved when no ink is deposited.

Where more precise or more dynamic color reproduction might be needed on colored substrates, it is within the scope of the invention to use a third separation to introduce an initially printed masking separation rendered with an opaque ink. While this might be any color, the masking image would most usually be printed with a white ink. The two color separations conveying the important color information in the source image have already largely been determined and attention now focuses on the procedure for finding a suitable separation to serve as a candidate separation to render the masking color.

In an illustrative example, the RGB original source image may be obtained and converted into CIE L*a*b* mode using Photoshop®. This operation is a look-up table conversion implemented in commercial software, such as Photoshop®, which maps RGB colors to their associated CIE L*a*b* color specifications and vice versa. Only the L* or darkness/lightness separation positive will be used. The L* separation positive encodes the achromatic black to white information in the scene (all object information is present). It is a logical choice for rendering the masking separation positive. It is a logical choice for generating the masking separation positive. This is used to create a third spot color separation positive to simulate the masking ink being printed on the colored substrate. If using Adobe Photoshop® or similar software, the L* separation positive is pasted into a new frame which, for present purposes, might be labeled "White Mask". This will be the initial separation positive for recording the opaque white ink that will be printed first. Once the L* lightness separation positive has been pasted, this separation positive is then rendered with a spot color approximating the color of the substrate. In an illustrative example, it is again PANTONE Brown 465, as shown in the separation positive at the top of FIG. 11. The remaining separation positives are again the earlier ones containing separation positives for Green 360 and Red 032 inks.

Figure 11:
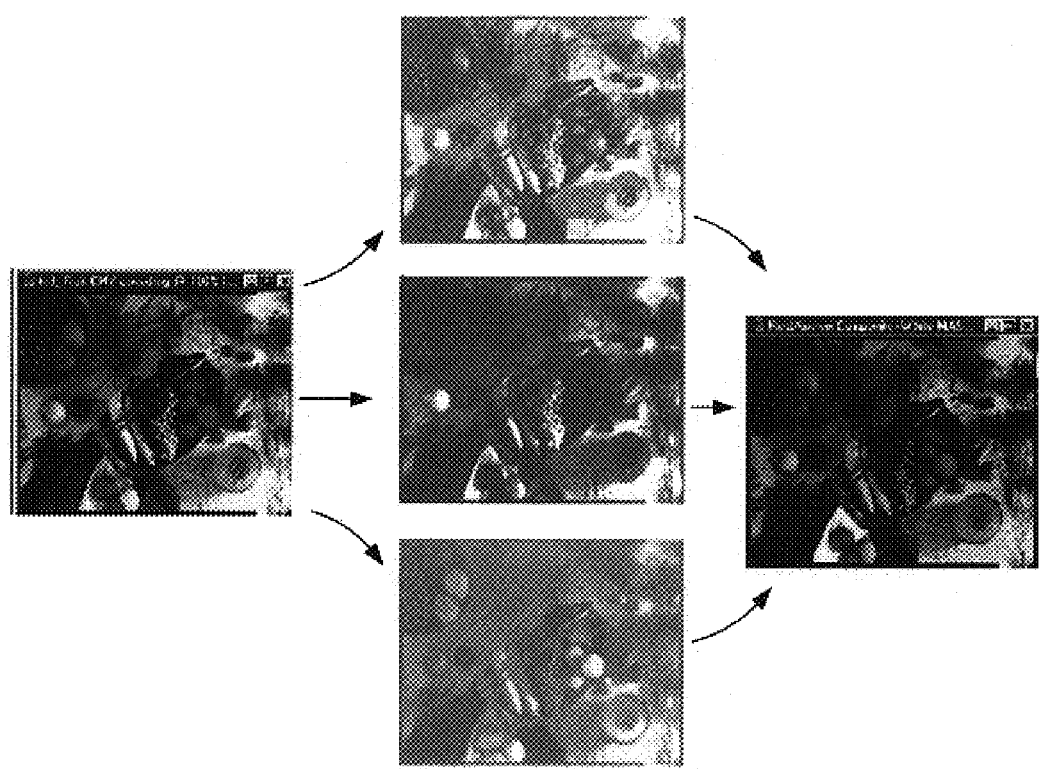
FIG. 11 is a spot color reproduction composite on unbleached Kraft formed from mask, red and green separation positives.
Figure 12A:
FIGS. 12A-12D illustrate the CMY source image of FIG. 6, the two spot color reproduction composite image of FIG. 8, the two spot color reproduction composite image of FIG. 10, and the spot color reproduction composite image with white mask of FIG. 11.
Figure 12B:
Figure 12C:
Figure 12D:

Optionally, global and local grayscale adjustments in the White Mask separation positive may be made. The amount of white ink can be increased in areas where high lightness is needed. In shadow areas, white ink may be removed to achieve lower luminance. The resultant printed image is seen in FIGS. 11 and 12D on unbleached Kraft stock where the opaque white mask is under-printed before the transparent red and green inks are laid down. The high brightness of the white ink helps to overcome or mask the darkening effect of the Kraft substrate. FIGS. 12B-12D show side-by-side images of the two-color rendition on white and Kraft stocks, taken from FIGS. 8 and 10, with the white masked image on Kraft stock of FIG. 11.

An alternative procedure that on occasions will be useful is to print the opaque masking separation after the two transparent inks have been printed. For example, a localized area of the reproduction composite image might be overprinted with a special spot color, fluorescent or metallic ink, varnish, or any other type of ink to achieve some particular effect.

Once all optional grayscale adjustments to the spot color separations are complete at block 224 of subprocess 200, and the color reproduction composite image renders realistically, the subprocess 200 ends. The process 100 then proceeds from block 112 to block 116, where the color separations are processed globally to improve misregistration tolerance in the reproduction composite image, as will be described in detail below.

As discussed above, the need to hold tight register between either the printing plates on press or various marking engines inherent with the device, e.g. a digital printer (ink, toner, wax, etc.) is common to all color reproduction processes and/or devices. This requirement has been a necessary pre-requisite since the invention of printing and all its manifest forms including photography, television, and modern digital imaging devices. Even a small displacement (say ⅟₃₂") in any one separation or channel is detrimental to the composite image and usually such misregister leads to an unsatisfactory reproduction since unpleasant or undesirable visual artifacts tend to render the print unusable or severely degrade image quality.

Figure 3:
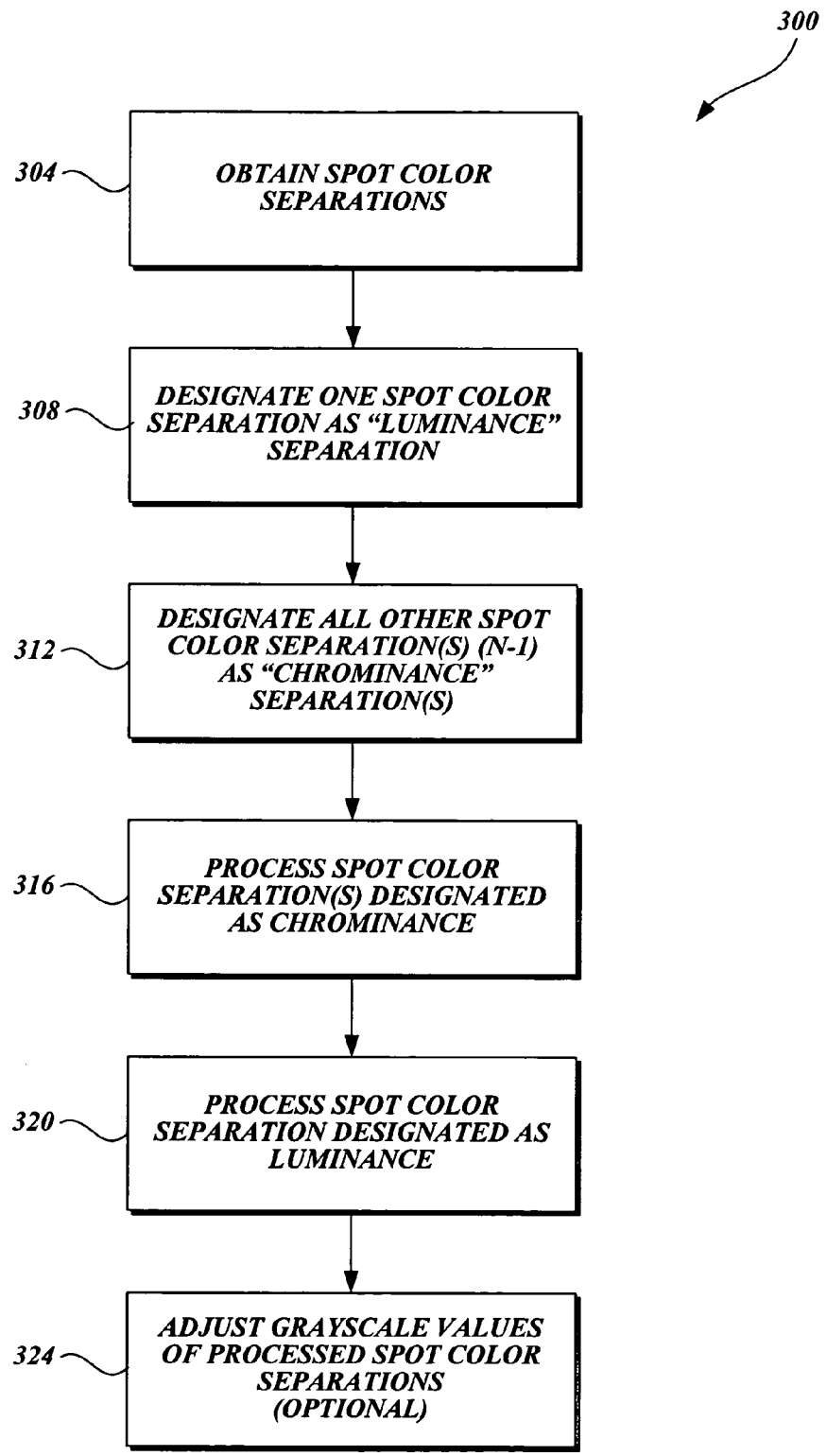
FIG. 3 is an exemplary flow chart depicting a global misregistration tolerance subprocess suitable for use by the prepress workflow process of FIG. 1.
Figure 13A:
FIGS. 13A and 13B are the spot color separation positives formed from the CMY source image of FIG. 6.
Figure 13B:

To that end, an exemplary global misregistration tolerance subprocess 300 for making color separations tolerant or having improved tolerance for misregistration when the reproduction composite image is printed will now be described in detail with reference to FIG. 3. While the discussion focuses on subprocess 300 being applied to spot color separations, it is well within the scope of the present invention that the same techniques could be applied to process color separations and higher order separation architectures. The routine 300 begins at block 304 where the color separations from block 112 are obtained. In the illustrated embodiment, the spot color separations from the subprocess 200 are obtained, which will be used to further illustrate the process 300. Next, at block 308, one of the spot color separations is designated as the "luminance" separation. This separation serves as an achromatic representation of the source image. When the color separations are equal to or greater than four (N≧4) under process printing or higher order printing architectures, the usual choice is to assign luminance to the black separation. However, in embodiments of the present invention with two spot color separations, there is greater latitude as to which of the two spot color separations to choose to encode luminance since black is not one of the color separations. For example, in the illustrative example shown in FIGS. 13A and 13B that include the red and green spot color separation positives of the reproduction composite image, the spot color separation which is seen visually to carry the most important luminance information assumes the role of a surrogate black separation. As such, in the illustrative example, the green spot color separation positive is chosen as the surrogate color separation in lieu of black. The remaining spot color separation(s) (N−1) is designated the "chrominance" separation in block 312. In the illustrative example shown in FIGS. 13A and 13B, the red spot color separation positive (FIG. 13A) is designated as a chrominance separation.

In a typical three ink scenario (N=3), the third color is often black and the black separation becomes the natural choice. However, if black is not one of the three inks to be used, the color separation which carries the bulk of the image luminance is selected, as was the case with the two color example. Usually this will also imply that the darkest ink of the three would be designated as the surrogate black separation.

The subprocess 300 then proceeds to block 316, where the spot color separation(s) designated as "chrominance" are passed through a low pass filter to degrade object (image or scene) detail. This may be done by the use of a blurring algorithm; i.e., generally implemented in the spatial domain by using an appropriately sized convolution kernel. The blurring algorithm is typically a Gaussian filter although it is not so restricted. The amount of image degradation or blurring will vary with the particular image; i.e., its size, resolution, content, and anticipated possible misregister. "Content" may relate to either or both scene colors or spatial frequency content. In this step, object blurring in the color separations is global, i.e., the entire image is blurred. Because the low pass filtering process reduces densities: i.e., they de-saturate colors in the composite image, additional adjustment steps may be taken to return color saturation to more proper levels.

Figure 14A:
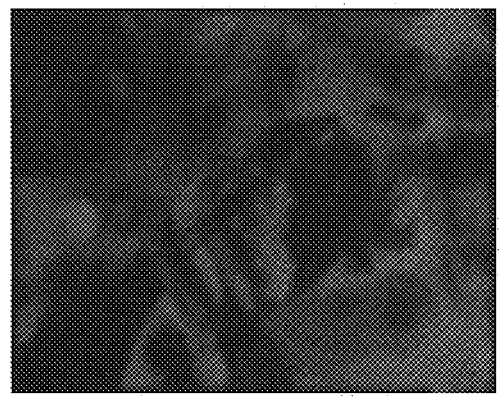
FIGS. 14A and 14B are the spot color separation positives of FIGS. 13A and 13B, respectively, after each has been processed through an appropriate filter using commercially available software.
Figure 14B:

The spot color separation designated as "luminance" is then processed by a high pass filter, such as a traditional unsharp mask (USM) or other image sharpening filters, at block 320. As such, object detail is maintained and preferably even enhanced. It will be appreciated that either the chrominance separations or the luminance separation may be processed first. In the illustrative example, with red and green inks, the green separation positive was designated the luminance separation and the red separation positive was designated the chrominance separation. Accordingly, the red separation positive is blurred to remove image detail, as best shown in FIG. 14A, while the green separation positive is preferably sharpened to accentuate detail, as best shown in FIG. 14B. It will be appreciated that embodiments of the present invention may only process (e.g.; filter) the chrominance separations instead of processing (e.g.; filtering) both chrominance and luminance separations, and vice versa. After the separations are globally processed, the subprocess 300 may optionally proceed to block 324, where grayscale adjustments may be made using commercially available software, such as Adobe Photoshop®. The subprocess 300 then ends.

Since methods of the present invention rely on conveying luminance content through only one separation, it is important that essential details of the source image appear in this separation. A visual comparison between the candidate luminance separation and the L* separation of the original image provides an excellent method for identifying the best selection based on similarity. A more detailed description of why this process is successful may be found below under the heading "Characteristics of the Human Visual System."

Figure 15:
FIG. 15 is the reproduction composite image formed from the processed spot color separation positives of FIGS. 14A and 14B using commercially available software.
Figure 16A:
FIGS. 16A and 16B are globally processed reproduction composite images that have one of their color separations shifted a selected amount to mimic misregistration or image phase error using commercially available software.
Figure 16B:

Once the color separations have been globally processed by subprocess 300, the misregistration tolerance of the reproduction composite image formed by the globally processed color separations is checked at block 120. The procedure to check misregistration tolerance of a reproduction composite image may, for example, be as follows. First, the globally processed separations are superimposed to form the globally processed reproduction composite image of the source image. FIG. 15 is a reproduction composite image formed by the superimposed processed separation positives of FIGS. 14A and 14B using commercially available software, such as Adobe Photoshop®. Once superimposed, the color separations are shifted to test the reproduction composite image's tolerance to misregistration. In one embodiment, the separations positives may be shifted in Photoshop® to simulate image phase error. FIGS. 16A and 16B illustrate how out-of-register images are simulated in Photoshop®. In the illustrative example shown in FIG. 16A, the green separation positive has been shifted toward the upper left, while in FIG. 16B, the green separation positive has been shifted toward lower right.

Figure 17A:
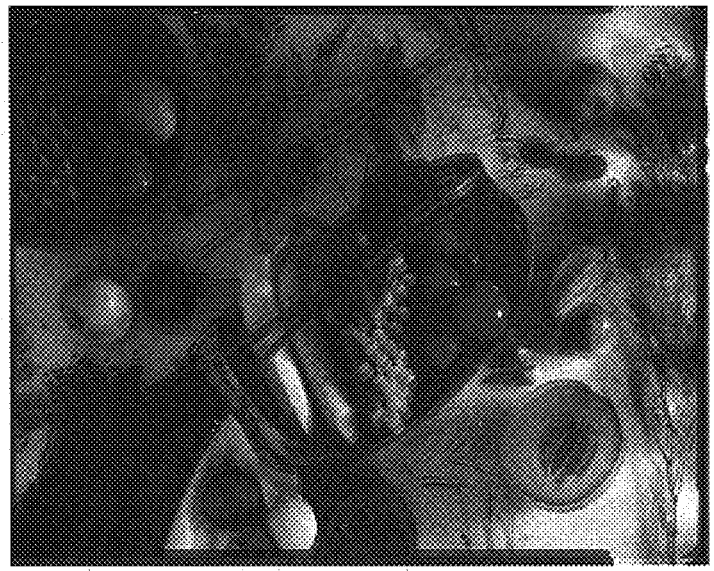
FIGS. 17A and 17B are unprocessed reproduction composite images that have one of their color separations shifted a selected amount to mimic misregistration or image phase error using commercially available software.
Figure 17B:

After the color separations have been shifted, the reproduction composite image is inspected to determine acceptability. In general, the reproduction composite image formed by the globally processed color separations are remarkably tolerant of misregistration. Unwanted sharp edges, white object borders, multiple images displaced from each other, or odd colors seen in the usual misregistered prints, are generally absent. Some minor halos may be noticed along object edges but these do not command the viewer's attention and are normally not objectionable or not even noticed. For a comparison, unprocessed, out of register reproduction composite images are shown in FIGS. 17A and 17B, where the green separation positive has been shifted toward the upper right and shifted toward the lower right, in the same amounts, respectively.

From a close inspection, however, it can been seen that at least two areas, the two cherries and the peach and the sprigs of herbs in the upper right hand corner of FIGS. 16A and 16B illustrate minor local misregistration problems. Thus, from block 120, the process 100 proceeds to block 124, where a determination is made as to whether the reproduction composite image is acceptable based on the global processing. If the answer is "yes" at block 124, the process 100 proceeds to block 140, where the process 100 ends. At this point, the separations may then be further processed to generated plates for printing, as known in the art. If the answer at block 124 is "no", the color separations are subject to more processing at block 128. In the illustrated embodiment, the process 100 proceeds to block 128, where the color separations are locally processed in an attempt to treat the misregistration problems (e.g., two cherries and peach and the sprigs of herbs) that occurred at block 120. It will be appreciated that the test for determining acceptability is highly subjective and varies depending on the application.

Figure 4:
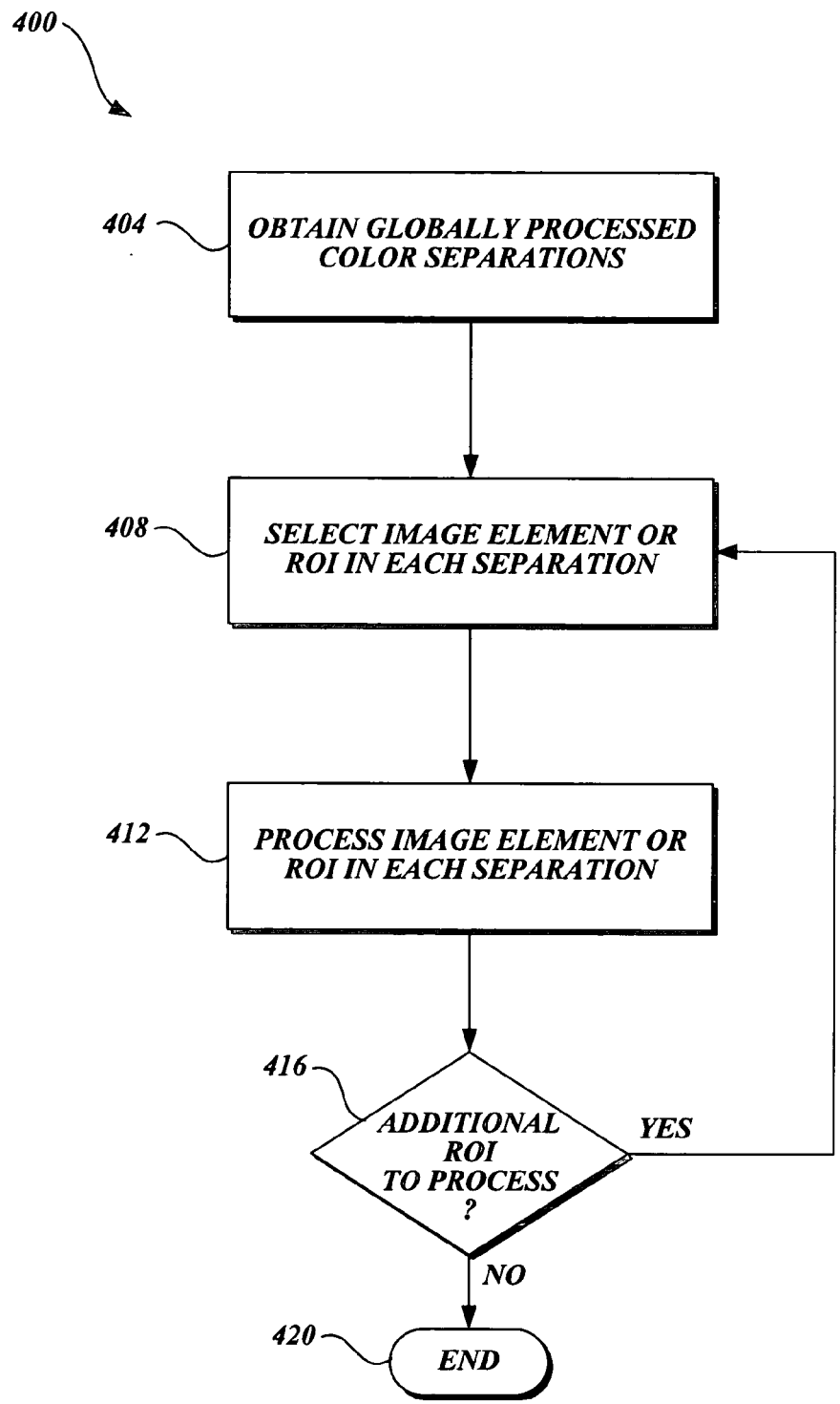
FIG. 4 is an exemplary flow chart depicting a local misregistration tolerance subprocess suitable for use by the prepress workflow process of FIG. 1.

As was described above, the color separations are further processed locally at block 128. In one embodiment, the color separations may be processed according to an exemplary subprocess 400 illustrated in FIG. 4. As best shown in FIG. 4, the subprocess 400 for locally processing the color separations will be described in detail. The subprocess 400 begins at block 404, where the globally processed separations from block 116 are obtained. For ease of illustrating the effects of local processing, the examples will be shown starting with the grayscale representations of the globally unfiltered separation positives shown in FIGS. 13A and 13B. However, it will be appreciated that in one embodiment of the present invention, globally processed separations are preferred. Next, at block 408, the first image element, also referred to herein as a region of interest ("ROI") that caused misregistration problems at block 120, is selected or highlighted in all of the color separations. For example, in the illustrated embodiment, the first image element or ROI generally designated 450 (i.e.; the sprigs of herbs) is selected, as shown best in FIGS. 18A and 18B. The subprocess 400 continues to block 412 from block 408, where the image element in each color separation is appropriately processed.

Figure 19A:
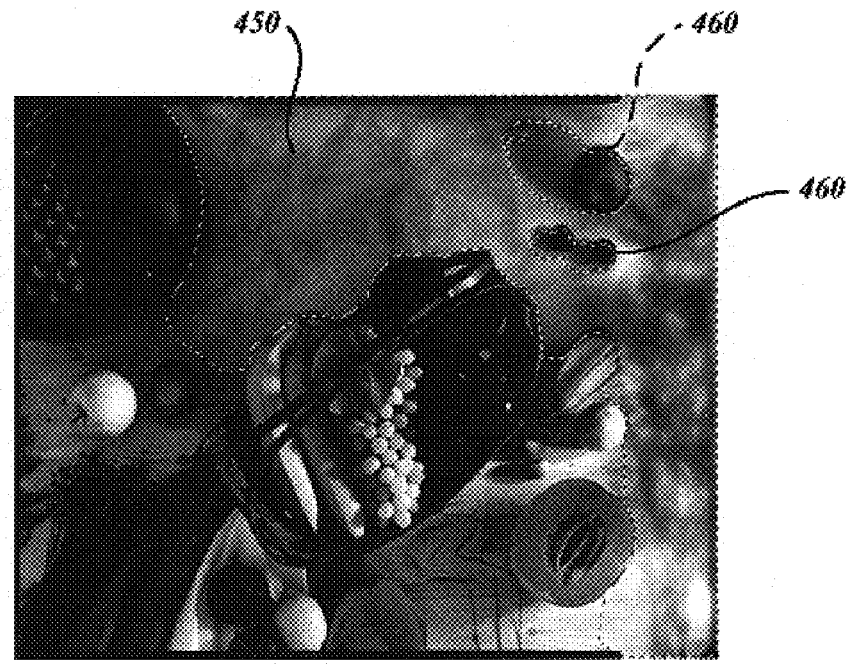
FIGS. 19A and 19B are the results of locally processing the grayscale separations of FIGS. 18A and 18B.
Figure 19B:
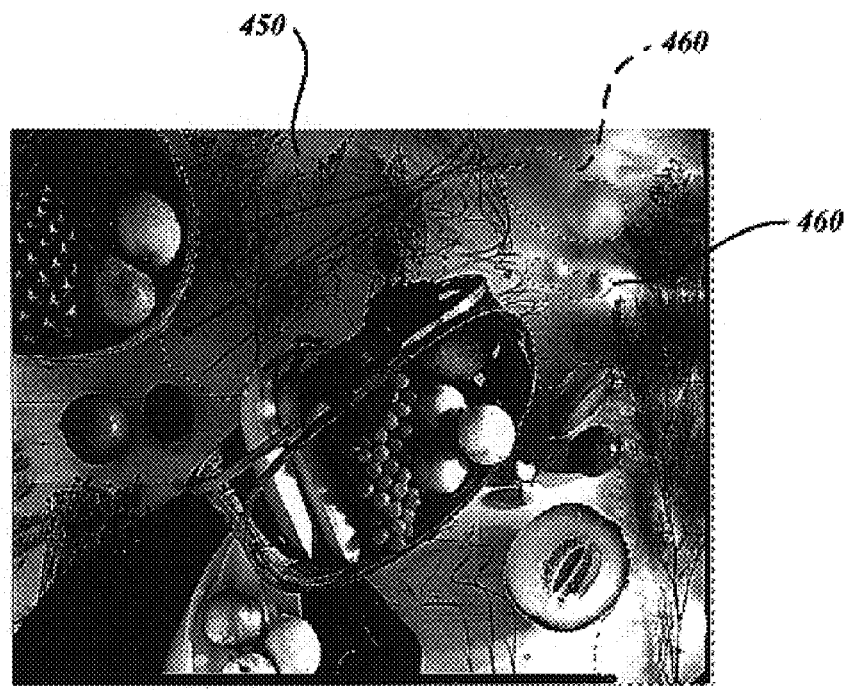

To appropriately process the image element in each color separation, the color separation that includes the most detail of the selected image element or ROI is generally chosen. This could either be a chrominance (N–1) separation or the luminance separation. In the illustrative embodiment, for the selected image element or ROI 450 (i.e.; the sprigs of herbs 450), the luminance separation (i.e., the green spot separation positive of FIG. 13B) includes the most detail. Thus, in the illustrative embodiment, the image element or ROI 450 of the green spot color separation positive is processed to enhance image detail. In one embodiment, the green spot color separation positive is processed by a high pass filter, such as a traditional unsharp mask (USM) or other image sharpening filters. It should be noted that only the image element or ROI 450 is processed in this step. The remaining portions of the separation does not undergo further processing. The results of the local processing of the green spot color separation positive is shown in FIG. 19B.

The image element or ROI 450 of the remaining separations are then processed through a low pass filter, such as a Gaussian filter, to degrade object (image or scene) detail. While low pass filtering is the primary chrominance channel processing operation and may be all that is necessary, there might be occasions where a different processing method is desirable. The object of low pass filtering ROI 450 in the red separation is to obviously eliminate high frequencies (edges) which can interfere with similar information being conveyed by the green ROI separation. Viewed in this manner, the luminance ROI can be thought of as the "foreground" and the chrominance ROI can be thought of as the "background" components, respectively. Depending on image content, however, one might wish to pursue a secondary processing operation aimed at modifying the "background" so that it renders more uniformly. What is effectively desired is to print the foreground (detail) with one ink (green) against a background which is approximately uniform (little detail) with the other (red). Smoothing the background simply means minimizing or eliminating regions of "white" (too little ink) and or "black" (too much ink) in the red separation. Doing this creates an approximate field. While blurring to a certain extent achieves this, it may be necessary to go beyond and "dodge" (soft ink removal) or "burn" (soft ink addition) such areas so as to end up with a more uniform background pertaining to the chrominance ROI. It should be noted that only the image element or ROI 450 is processed in this step. In the illustrative embodiment, the image element or ROI 450 of the red spot color separation positive is processed through a low pass filter. As such, only one color separation contains image detail for each image element or ROI.

In one embodiment where the globally processed green and red separation positives of FIGS. 14A and 14B are further processed according to the subprocess 400, further processing of the image element or ROI 450 does not need to be repeated since the globally processed green separation positive was globally processed with an unsharp mask at block 116. Similarly, the image element or ROI 450 of the red separation positive does not need to be blurred. Thus, in this embodiment, local filtering of the image element or ROI 450 could not address the minor misregistration problem existing at block 120. It will be appreciated that other processing steps may be done in an attempt to correct the misregistration problem, such as "image trapping", as known in the art. In some instances it may be preferred to select another color separation (i.e.; a separation that does not contain the most detail) to be sharpened based on colors used and amount of ink needed to render the image element (i.e.; attributes of the color source image and/or the color separations), as will be explained in detail below.

Once the first image element or ROI 450 has been processed or addressed at block 412, the subprocess 400 proceeds to block 416, where a determination is made whether there are additional image elements or ROIs to be locally processed. If the answer is "no" at block 416, the subprocess 400 proceeds to block 420, where the subprocess 400 ends. If the answer at block 416 is "yes", the subprocess 400 returns to block 408, where the next image element or ROI noted as a potential problem at block 120 is processed. For example, in the illustrated embodiment, the other image element or ROI designated 460 (i.e.; two cherries and peach), described above with regard to block 120 has not been processed. As such, the subprocess 400 returns to block 408, where the next image element or ROI is processed.

Figure 18A:
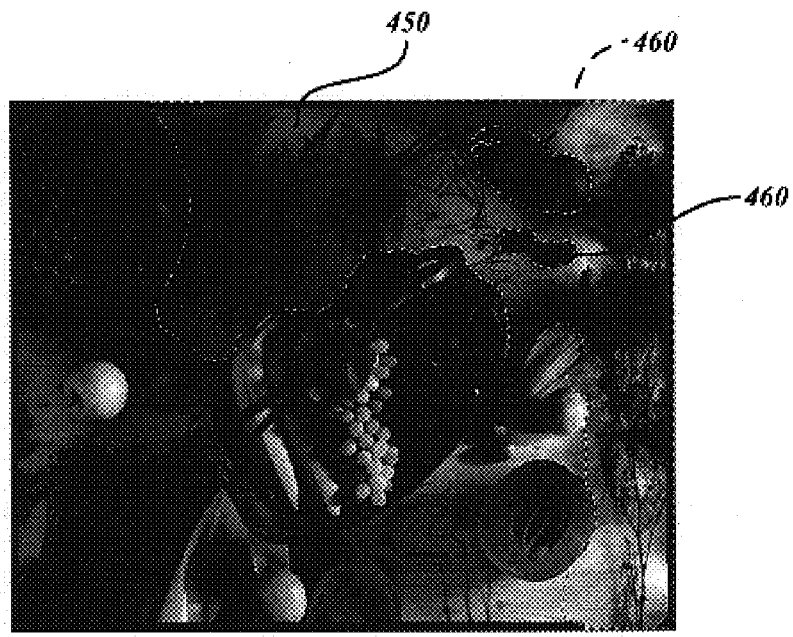
FIGS. 18A and 18B are grayscale separation positives of the red and green color separations of FIGS. 13A and 13B, where image elements or ROIs have been selected.
Figure 18B:
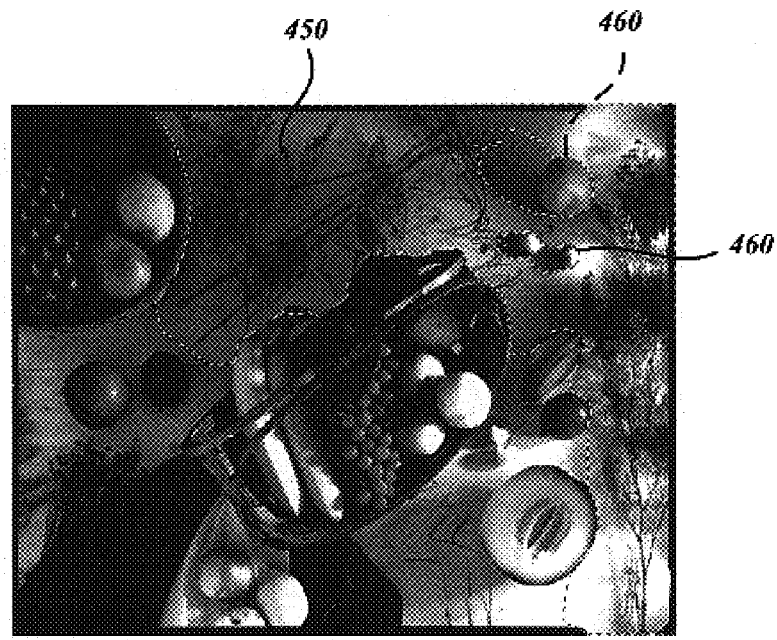

Returning now to block 408, the next image element or ROI that caused misregistration problems at block 120 is selected or highlighted in all color separations. For example, in the illustrated embodiment, the second image element or ROI 460 is selected as best shown in FIGS. 18A and 18B. For ease of illustration, FIGS. 18A and 18B are also used to illustrate the second image element or ROI 460. However, it will be appreciated that at this stage in the process 100, the first image element or ROI 450 of each color separation would have been locally processed as shown in FIGS. 19A and 19B.

The subprocess 400 continues to block 412 from block 408, where the image element or ROI 460 is appropriately processed. As was described above, the color separation that includes the most detail of the selected image element or ROI is generally chosen. However, this is not always the case. For example, based on the colors used and the amount of ink needed to render the image element or ROI, a color separation other than the one showing the most detail may be chosen. In the illustrative embodiment, although the green spot color separation positive shows the most detail of the image element or ROI 460 in FIG. 13B, the red spot color separation positive is preferably chosen. Accordingly, the image element or ROI 460 in the red spot color separation positive is processed to enhance image detail by, for example, an unsharp mask filter. Next, the image element or ROI 460 of the remaining color separations (N−1) is then processed to decrease image detail by, for example, using a blurring filter. It should be noted that only the image element or ROI 460 is processed in this step. As such, only one color separation contains image detail for each image element. The results of the locally processed image element or ROI 460 of the red and green spot color separation positives are shown in FIGS. 19A and 19B, respectively.

In the illustrative embodiment, the luminance and chrominance designation have been reversed for the image element or ROI 460. This may be done to minimize the "haloing" effect which can appear when the separation plates go out of register and hard green or red edges suddenly appear in the image. An examination of the cherries and peaches, the image element or ROI 460, in the red and green spot separation positives shown in FIGS. 18A and 18B illustrate that heavy amounts of red ink are needed to render the fruits while considerably less green ink is need. Thus, had the detail of the fruit been rendered with the green separation, it would have effectively created a large white space, known as a "trap", for trapping the red ink. In instances where registration between the plates is good or where a digital printing apparatus, such as a computer printer, is used, this technique may pose little or no problem. However, when the printing plates go out of register, unwanted red edges could become visible as they migrate into the white space present in the green separation.

Once the second image element or ROI 460 has been processed at block 412, the subprocess 400 proceeds to block 416, where a determination is made whether there are additional image elements or ROIs to be locally processed. If the answer is "no" at block 416, the subprocess 400 proceeds to block 420, where the subprocess 400 ends. If the answer at block 416 is "yes", the subprocess 400 returns to block 408, where the next image element or ROI noted as a potential problem at block 120 is processed. For example, in the illustrated embodiment, both of the misregistration problems noted at block 120 have been addressed. Accordingly, the subprocess 400 proceeds to block 420, where the subprocess 400 ends.

Figure 20:
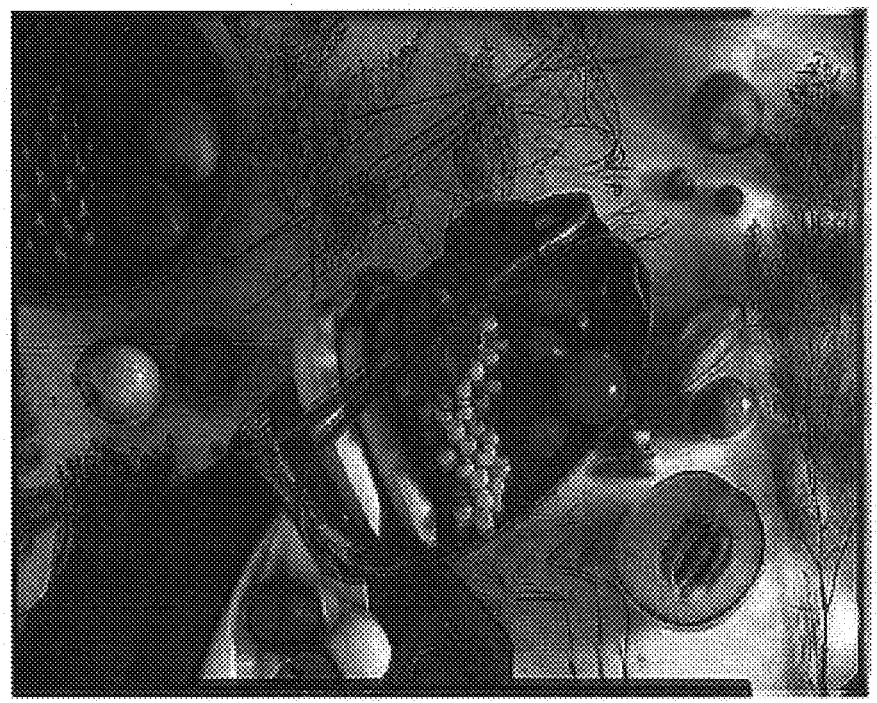
FIG. 20 is a reproduction composite image formed by the superimposed processed separations of FIGS. 19A and 19B.
Figure 21A:
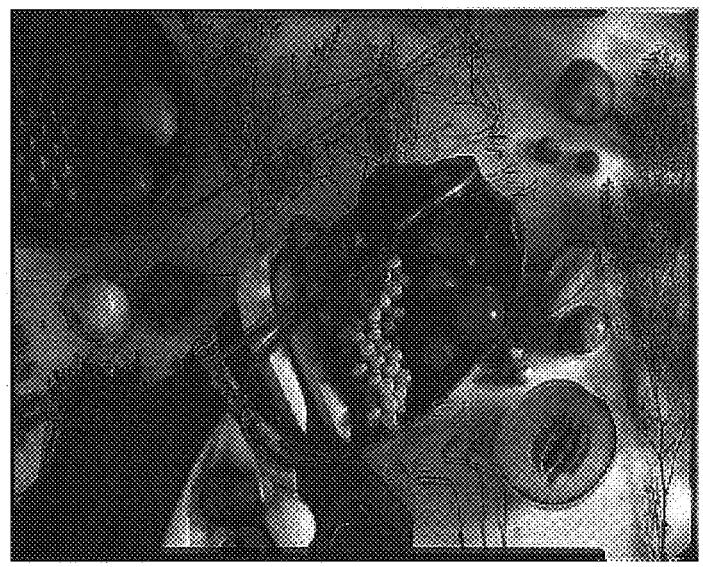
FIGS. 21A and 21B are reproduction composite images of FIG. 20 that have one of their color separations shifted a selected amount to mimic misregistration or image phase error using commercially available software.
Figure 21B:

Once the image elements or ROIs noted at block 120 have be locally processed by subprocess 400, the processed separations are superimposed to render a processed reproduction composite image of the source image. FIG. 20 is the reproduction composite image formed by the superimposed processed separations of FIGS. 19A and 19B. Once superimposed, the separations are shifted to test the image elements or ROI's tolerance to misregistration at block 132. In one embodiment, the separations positives may be shifted in Photoshop® to simulate image phase error. FIG. 21 illustrates how out-of-register images were simulated in Photoshop®. In the illustrative example shown in FIG. 21A, the green separation positive has been shifted toward the upper left, while in FIG. 21B, the green separation positive has been shifted toward lower right.

After the color separations have been shifted, the reproduction composite image is inspected or checked at block 132 to determine if all of the problems noted in block 120 were addressed or have been corrected. From block 132, the process 100 proceeds to block 136, where a determination is made as to whether the reproduction is acceptable based on local processing or if all misregistration problems were addressed. If the answer is "yes" at block 136, the process 100 proceeds to block 140, where the process 100 ends. At this point, the separations may then be further processed to generate plates for printing, as known in the art. If the answer at block 136 is "no", the process 100 may return to block 128, where further processing of the color separations is conducted. In the illustrated embodiment, the two-ink color globally filtered composite still exhibits some minor artifacts not mentioned at block 120, for example, the red fringe migrating into the white napkin, and thus, the process may return to locally process green table/cloth-white napkin image element or ROI.

Several embodiments of the present invention do not claim to reproduce color, with respect to the original, with accuracy. However, these embodiments of the present invention do preserve the basic hues and luminosity found in the unfiltered source image. After filtering, it yields a pleasing natural-looking image that minimizes or eliminates the obvious undesirable artifacts associated with misregistered separations. Such separations survive the difficult manufacturing environment where tight registration is difficult to achieve.

It should be noted that unlike conventional color separation where image detail is present in all separations (usually N=4 under process printing), methods of the present invention use only one of N separations to carry the image detail. Consequently, the need for higher spatial frequencies (detail) in the remaining N−1 separations is unnecessary. Carrying image detail in those separations is redundant. More importantly, retaining high spatial frequencies (detail) in these remaining separations would produce image artifacts should the printing plates go out of register.

With conventional CMYK process printing, as many as four superposed inks might be applied to render the color of a given half-tone dot. This practice requires that all four ink planes be in perfect register to render the color properly. One optional advantage of the methods of the present invention is that a fewer number of inks may be used to achieve a satisfactory color rendition. If the number of ink planes can be minimized, this effectively reduces the ink's misregistration degrees of freedom at the time of printing. By printing with fewer inks, the penalty for a color separation being out of register is reduced.

C. CHARACTERISTICS OF THE HUMAN VISUAL SYSTEM

Embodiments of the present invention exploit the unique characteristics of the human visual system. A brief review of the human visual system, specifically the acuity characteristics of black & white (luminance) and color vision (chrominance), is useful to understanding aspects of the present invention. A large body of literature in the field of vision research has shown that contrast sensitivity to luminance and chrominance are considerably different. Objects can be better distinguished from each other or their background, if the difference in luminance or chrominance is large. Of these two factors, however, luminance plays the most important role. Furthermore, it isn't the absolute difference in luminance, which matters but the relative difference. Like most imaging systems, the human visual system attenuates (reduces) image contrast while removing (filtering out) high spatial frequencies in a scene. The term "contrast" is defined as the difference between two luminances divided by their sum. Objects that have small contrast with respect to their background are difficult to distinguish. The reciprocal of the minimum contrast needed for detection of an object is referred to as "contrast sensitivity". Just as temporal frequency refers to how rapidly a signal is vibrating or oscillating with time, i.e. cycles per second, the term "spatial frequency" refers to how an optical signal is varying with distance, i.e. the contrast of a black and white signal in space. Spatial frequency is measured in cycles per mm or equivalently, cycles per degree (cpd) of viewing angle, a viewing-distance independent relative measure.

Figure 22:
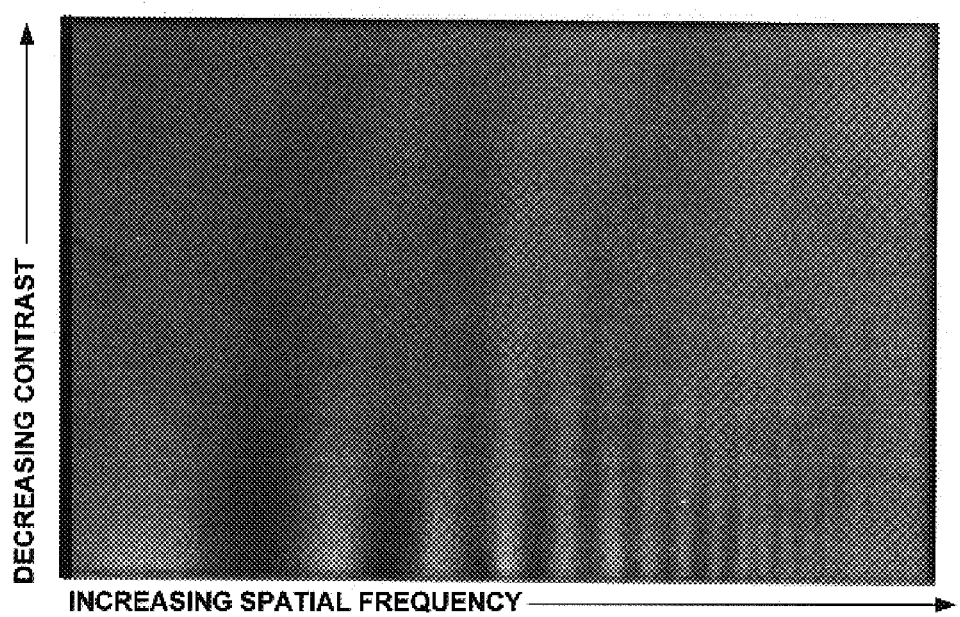
FIG. 22 is an illustration of contrast modulation as a function of sinusoidal test patterns of varying spatial frequencies.

Investigations of the contrast sensitivity of the human visual system are typically done using test patterns. Typically, sinusoidal patterns are used, as illustrated in FIG. 22. For a sinusoidal luminance pattern, contrast is defined as the amplitude of the black and white sinusoidal variation divided by its average luminance (mean grayness). This expression is often called "modulation depth" or simply "modulation". The minimum modulation required for the detection of this pattern is referred to as the "modulation threshold". By modulating sinusoidal gratings of varying spatial frequencies (as shown in FIG. 22) and recording what the modulation threshold is at each frequency, the contrast sensitivity function or its equivalent, the modulation transfer function can be determined. Knowledge of the contrast sensitivity function or modulation transfer function is vital in that it not only fully characterizes, but determines the performance and capabilities of the human visual system.

Figure 23:
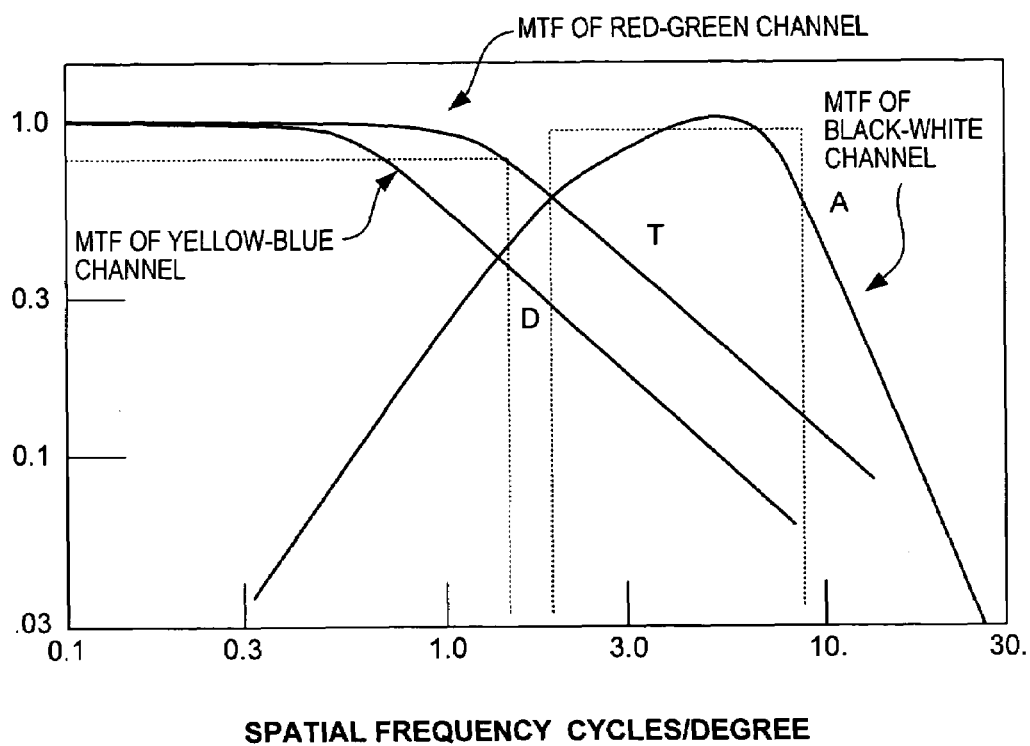
FIG. 23 is a plot of the chromaticity and luminosity modulation transfer functions of the human visual system.

FIG. 23 is a plot of Granger's chromaticity and luminance modulation transfer functions for the human visual system (Edward Maurice Granger, Ph.D. Dissertation, *Specification of Color Image Quality*, University of Rochester (N.Y.), 1974). The modulation transfer function of the black and white channel (curve labeled "A") which characterizes luminance acuity is essentially band pass (dashed box). This pass band is only about two-octaves wide, ranging roughly between 2-8 cycles per degree (cpd) of viewing angle. The modulation transfer functions for the red-green and yellow-blue opponent channels (labeled "T" and "D", respectively) characterize the human visual systems chrominance acuity. Chrominance acuity can be modeled as low pass (dashed box). While red-green acuity is slightly more sensitive to high spatial frequencies than yellow-blue, the difference is small. In essence, the cutoff frequency for chrominance acuity is roughly one cpd and there is little significant frequency overlap between the chrominance and luminance modulation transfer functions. From FIG. 23, it is evident that chromatic frequencies beyond the cutoff frequency of 1 cpd cannot be seen. However, achromatic frequencies above 1 cpd are perceptible. Given this processing dichotomy, the removal or absence of high spatial frequencies in the chrominance channels should not be readily discernable to the human eye provided the luminance channel conveys the full spatial frequency content of the original image. In other words, one can filter the frequency content of an image's luminance channel to correspond to the band-pass characteristics of the human visual systems luminance modulation transfer function. The same can be done with the frequency content in the chrominance channels to correspond to the low-pass characteristics of the chrominance modulation transfer functions.

Methods of the present invention attempt to exploit this unique characteristic of the human visual system in the following manner:

(a) by designating a specific ink color separation to serve as the luminance separation;

(b) encoding the designated luminance separation with wide band spatial frequencies;

(c) preferably accentuating the luminance separation's high spatial frequencies to amplify detail;

(d) designating the remaining ink separations to serve as chrominance separations; and (e) digital filtering to remove the mid to high spatial frequencies in each of the chrominance separations so that they convey only narrow band, low-frequency content.

By properly filtering the appropriate separations according to the human visual system's luminance and chrominance bandwidth characteristics, and then assembling a composite image, the image has been found to appear approximately the same as a reproduction made using conventional separation methods; i.e. without filtering. The theoretical foundation of several methods of the present invention require the separation of a color image's spatial frequency content into two parts. A chromatic component consists of only low spatial frequency content (narrow band). A corresponding luminance component consists of the full spatial frequency content (wide band).

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method of making a digital image, the method comprising:
   preparing N digital color separations from a source image, where N is 2 or greater;
   processing the N digital color separations globally to improve printing misregistration tolerance in a reproduction composite image formed by the processed color separations; and thereafter
   processing further the N digital color separations if the global processing does not achieve acceptable misregistration tolerance results for at least one region of interest, the region of interest being processed to improve printing misregistration tolerance for the respective region of interest.

2. The method of claim 1, wherein preparing N digital color separations from a source image includes
   preparing N spot color separations from a source image, wherein the N digital spot color separations, when superimposed, form a reproduction composite image similar in color to the source image.

3. The method of claim 2, wherein preparing N digital spot color separations from a source image includes
   obtaining cyan, magenta, and yellow image separations from the color source image;
   determining visually selected dominant object colors of the color source image;
   obtaining first and second transparent ink spot colors from a color palette which suitably represent the selected dominant object colors;
   selecting first and second image separations from the cyan, magenta, and yellow image separations which represent the two image separations that carry the most color in the color source image; and
   assigning the first and second selected transparent ink spot colors to the first and second image separations, respectively, thereby forming first and second spot color separations.

4. The method of claim 1, wherein processing the generated N digital color separations globally includes
   choosing the digital color separation conveying the greatest image detail to be a luminance separation;
   assigning the remaining N−1 digital color separations as chrominance separations; and
   degrading image detail in the chrominance separations.

5. The method of claim 4, further including enhancing image detail of the luminance separation.

6. The method of claim 1, further comprising
   superimposing the globally processed color separations;
   shilling at least one digital color separation a selected amount to imitate misregistration of plates during printing or image phase error; and
   determining whether the reproduction composite image formed by the superimposed and shifted color separations is acceptable.

7. The method of claim 6, wherein processing the region of interest of the N digital color separations further includes
   selecting the region of interest of the reproduction composite image if the reproduction composite image formed by the superimposed and shifted separations is not acceptable;
   selecting a digital color separation based on attributes of at least one of the color source image and the prepared color separations;
   processing the image element of the selected color separation for enhancing image detail; and
   processing the image element of the remaining N−1 digital color separations for degrading image detail.

8. The method of claim 7, wherein selecting one of the color separations based on said attributes of at least one of the color source image and the prepared color separations includes
   selecting the digital color separation conveying the greatest image detail.

9. The method of claim 1, wherein the color separations are selected from the group consisting of CMY, CMYK, and CMY abc color separations.

10. The method of claim 9, wherein processing the generated N digital color separations globally includes
    choosing the digital color separation conveying the greatest image detail to be a luminance separation;
    assigning the remaining N−1 digital color separations as chrominance separations;
    enhancing image detail of the luminance separation; and
    degrading image detail in the chrominance separations.

11. The method of claim 10, wherein local processing includes
    selecting one of the digital color separations based on attributes of at least one of the color source image and the prepared color separations;
    selecting a portion of the digital color separation and enhancing image detail of the selected portion; and
    selecting the previously selected portion in the remaining N−1 digital color separations and degrading image detail of the selected portions.

12. The method of claim 11, wherein selecting one of the digital color separations based on attributes of at least one of the color source image and the prepared color separations includes
    selecting the digital color separation conveying the greatest image detail.

13. A color reproduction composite image formed by the method of claim 1.

* * * * *